United States Patent [19]

Miyagawa

[11] 4,023,211

[45] May 17, 1977

[54] APPARATUS FOR AUTOMATICALLY FORMING THREADED PORTION HAVING PREDETERMINED TAPER AND LENGTH FOR USE IN AUTOMATIC THREADING MACHINE

[75] Inventor: Fumiko Miyagawa, Higashiosaka, Japan

[73] Assignee: Rex Industrial Co., Ltd., Japan

[22] Filed: Nov. 4, 1975

[21] Appl. No.: 628,736

[30] Foreign Application Priority Data

Nov. 29, 1974 Japan .............................. 49-137487

[52] U.S. Cl. ........................ 10/96 T; 10/120.5 R; 408/178
[51] Int. Cl.² ...................... B23G 1/02; B23G 5/12
[58] Field of Search .... 10/94, 96 R, 96 T, 120.5 R, 10/120.5 AD; 408/173, 178

[56] References Cited

UNITED STATES PATENTS

| 965,156 | 7/1910 | Coes et al. .......................... 10/96 T |
| 1,251,209 | 12/1917 | Fisher ................. 10/96 T |
| 1,318,519 | 10/1919 | Williams ....................... 10/120.5 R |
| 1,396,989 | 11/1921 | Breitenstein ................... 10/120.5 R |
| 1,527,185 | 2/1925 | Hall .................... 10/96 T |
| 1,576,652 | 3/1926 | Hall .............................. 10/120.5 R |

Primary Examiner—C.W. Lanham
Assistant Examiner—E. M. Combs
Attorney, Agent, or Firm—Wenderoth, Lind & Ponack

[57] ABSTRACT

Apparatus comprising a die head, a carriage provided with the die head and a pair of support rods mounted on a frame in parallel thereto and supporting the carriage movably in opposing relation to the pipe to be threaded. An elongated cavity parallel to the frame is formed in the carriage at a position immediately below the front end of an arm for advancing and retracting chasers on the die head. The support rod on the frame is disposed in the cavity, and a profile member fitted in the elongated cavity is movably supported by the support rod. The front end of the arm on the die head is placed on the top profile surface of the profile member, so that the threading torque of the die head causes the arm to fixedly press the profile member against the suppot rod and, at the same time, the lead of the chasers advances the carriage, while permitting the arm to move on the top surface of the profile member. Thus the open end of the pipe is formed with a tapered threaded portion having a predetermined length.

3 Claims, 9 Drawing Figures

APPARATUS FOR AUTOMATICALLY FORMING THREADED PORTION HAVING PREDETERMINED TAPER AND LENGTH FOR USE IN AUTOMATIC THREADING MACHINE

BACKGROUND OF THE INVENTION

The present invention relates to an apparatus for automatically controlling chasers for use in automatic threading machines to automatically form a threaded portion having predetermined taper and length at the end of a pipe or like tube on the outer peripheral surface thereof.

Ideally, it is desired that automatic threading machines satisfy the following requirements.

First, they must be easily adjustable to form a threaded portion of predetermined taper and length.

Second, they must be capable of threading a desired number of pipes to form uniform threaded portions with high accuracy.

Third, they must be easily operable even by unskilled persons.

Conventionally, in threading the end of a pipe to form an external threaded portion having the desired taper and length, the chasers are slowly moved in centrifugal direction by manually operating the die head to control the degree of engagement of the chasers and to thereby give the desired taper to the threaded portion, while the chasers are being advanced to thread the pipe over the specified length. Accordingly, the operation invariably requires a skilled person and involves extreme difficulties in forming the desired tapered threaded portion with high accuracy and therefore in improving the efficiency.

SUMMARY OF THE INVENTION

The present invention provides an apparatus in which a carriage provided with a die head incorporates a profile mmember which is replaceable or movable so that a threaded portion having the desired taper and length can be easily formed even by an unskilled person, the apparatus thus fulfilling the foregoing requirements.

The apparatus for automatically forming a threaded portion having predetermined taper and length for use in an automatic threading machine includes a pair of support rods mounted on a frame in parallel thereto and a carriage movably supported by the support rods and provided with a pipe cutter, a reamer and a die head, the die head having an arm turnable upward or downward to centripetally advance or centrifugally retract chasers in radial direction for a thread cutting operation. The die head is automatically advanced toward a pipe on the apparatus by virtue of the lead of the chasers on the die head and, at the same time, the arm placed on a profile member fitted in the carriage is pressed by the threading torgue against the profile member, which in turn is thereby fixedly pressed against the support rod extending through the carriage and fixed to the frame. The arm is advanced on the top slanting profile surface of the profile member. In this way, a threaded portion is automatically and accurately formed in the pipe which portion has a predetermined taper and a predetermined length.

DESCRIPTION OF THE PREFERRED EMBODIMENT

Figure 1:
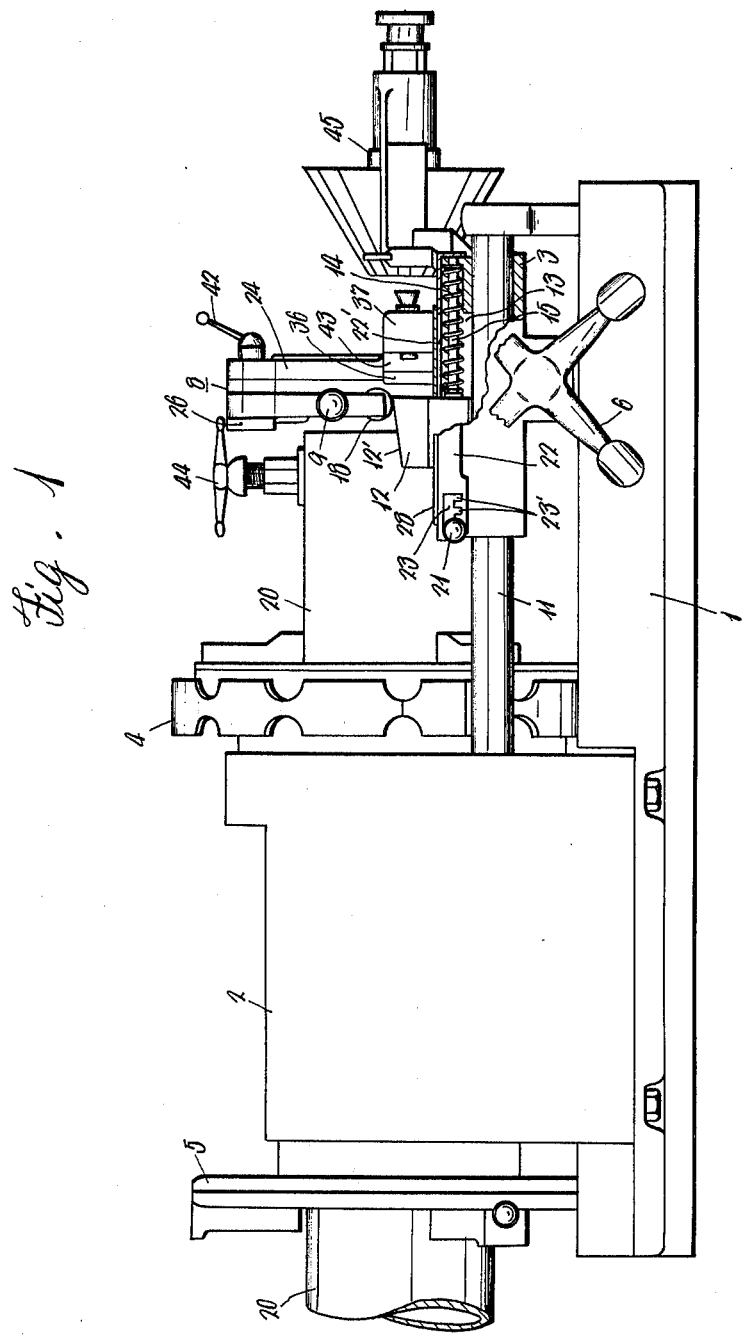
FIG. 1 is a front view showing an automatic threading machine including a cutting apparatus of this invention.
Figure 5:
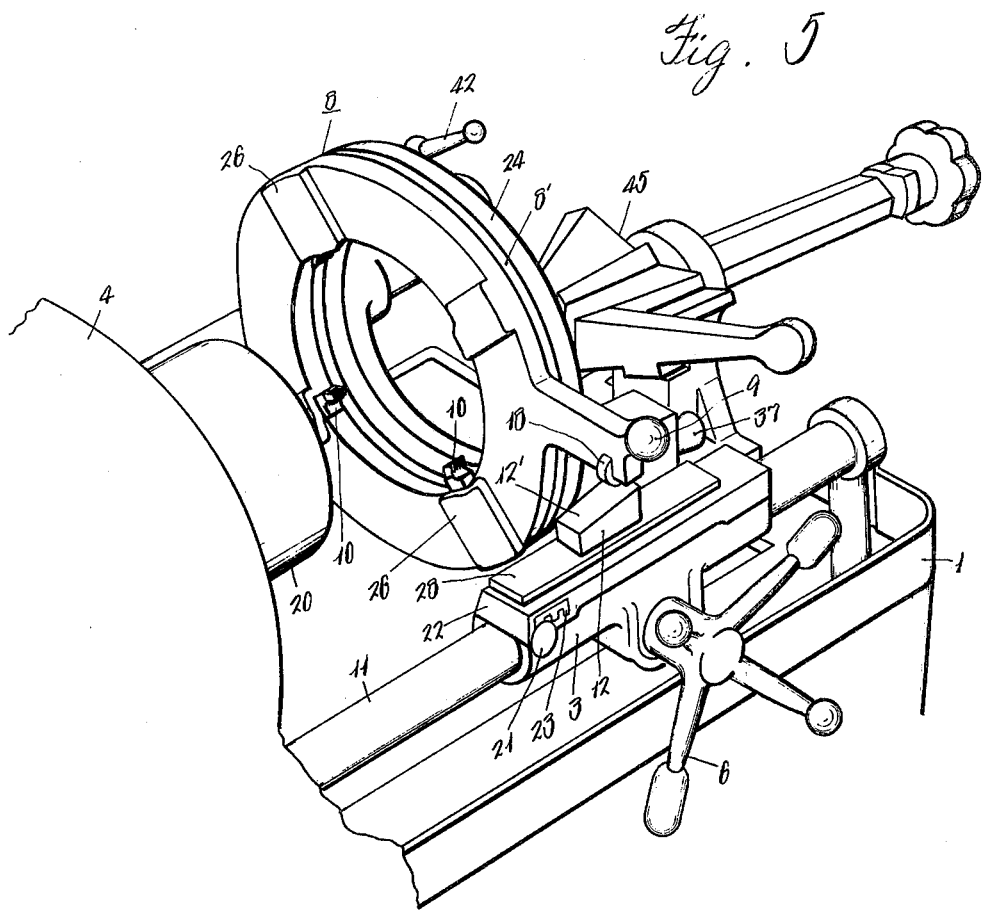
FIG. 5 is a perspective view showing the automatic threading machine including the cutting apparatus of this invention.

This invention will be described below in detail with reference to the accompanying drawings. FIGS. 1 and 5 show a threading machine equipped with an apparatus of this invention.

A pipe 20 secured by chucks 4 and 5 to the left end portion of a frame 1 is rotatable by drive means 2. A pair of support rods 11 and 11 are fixedly mounted on the right side of the frame 1 parallel to the frame 1. A carriage 3 movably mounted on the support rods 11 is provided with a pipe cutter 44, a die head 8 and a reamer 45 which are arranged subsequent to the drive means 2 in the order mentioned.

Figure 2:
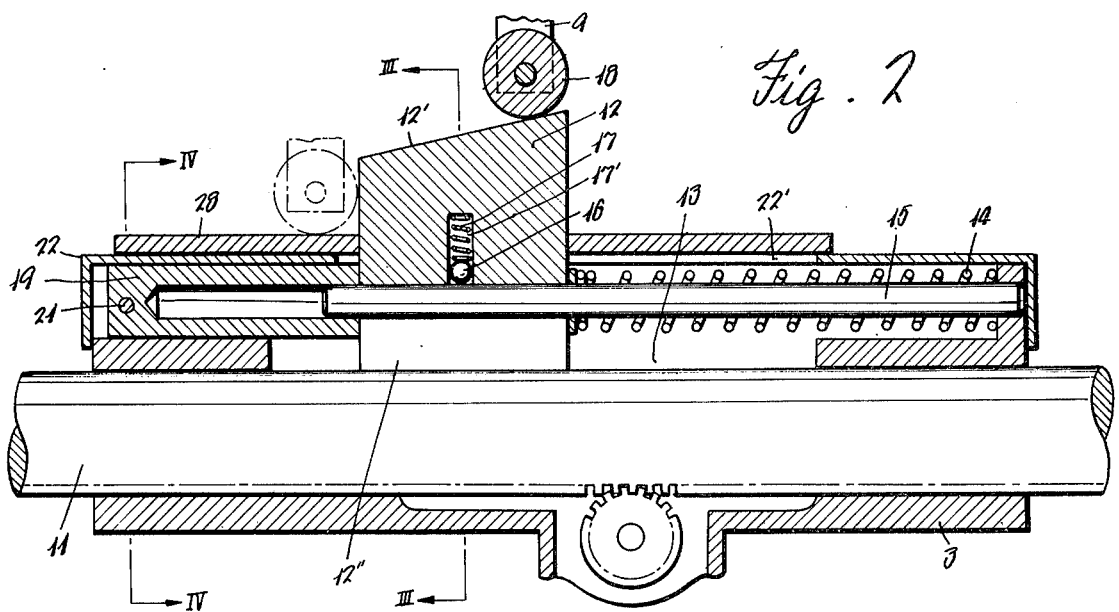
FIG. 2 is an enlarged view in vertical section showing the principal parts of the same.
Figure 3:
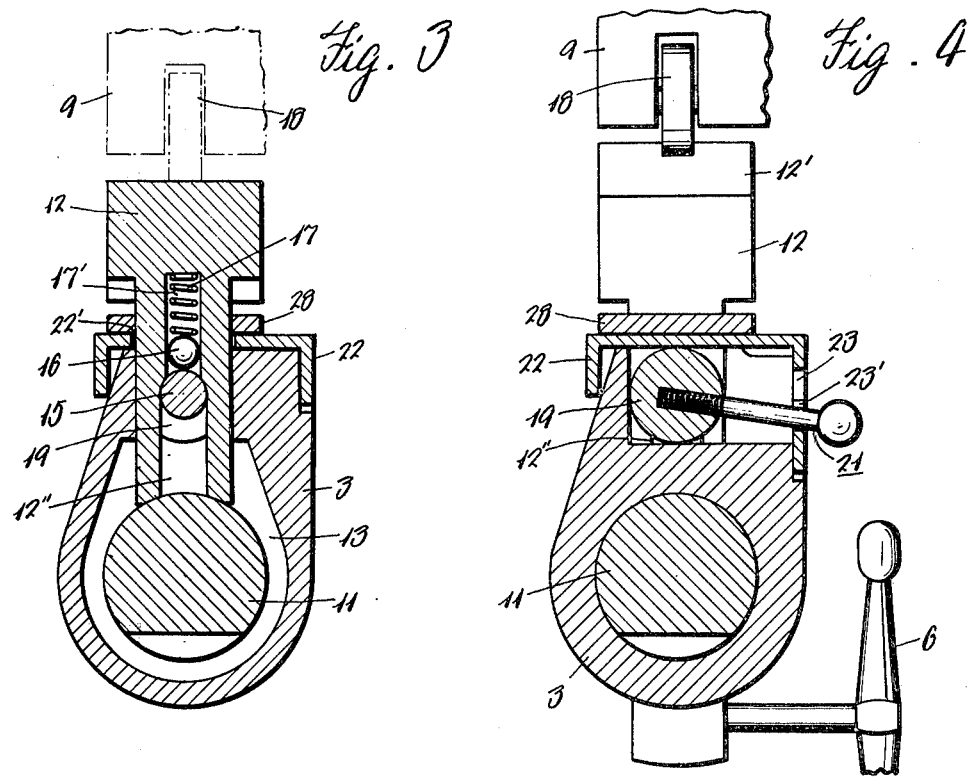
FIG. 3 is a view in section taken along the line X—X in FIG. 2.
Figure 4:
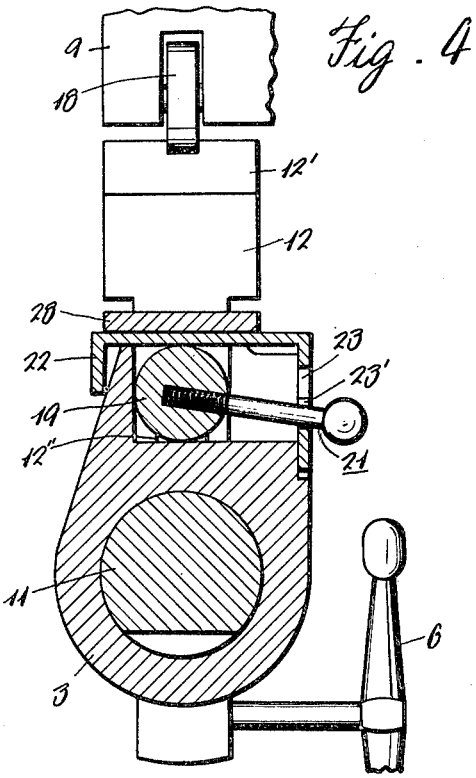
FIG. 4 is a view in section taken along the line Y—Y in FIG. 2.

Further as shown in FIG. 2, a profile member 12 is fitted in an elongated cavity 13 formed in the carriage 3 longitudinally of the frame 1 and is positioned closer to the front portion of the carriage 3 (on the right-hand side in FIG. 2).

The profile member 12 is formed in its under surface with the groove 12″ parallel to the support rod 11 having a width smaller than the diameter of the support rod 11. A guide rod 15 disposed within the cavity 13 and positioned above and parallel to the support rod 11 has a smaller diameter than the support rod 11 and is fitted in the groove 12″. A spring 14 loosely fitted around the guide rod 15 holds the profile member 12 pressing contact with the open end of an adjusting sheath 19 receiving the rear end (on the left-hand side in FIG. 2) of the guide rod 15. At the center of the grooved portion 12″ of the profile member 12, there is formed an upwardly extending vertical bore 17′ accommodating therein a spring 17 and a ball 16 positioned beneath the spring 17. The profile member 12 has a profile surface 12′ upwardly slanting toward the front.

The guide rod 15 has a front end supported by the carriage 3 and a rear end inserted into and supported by the adjusting sheath 19 which is slidably placed in the rear end of a cover 22 covering the top of the carriage 3.

A handle 21 fixed to one side of the rear end portion of the adjusting sheath 19 extends through an aperture 23 formed in one side of the rear end portion of the cover 22. The apertured portion 23 has position determining recesses 23′ at specified spacing. The adjusting sheath 19 is slidable by moving the handle 21 to shift the profile member 12 against the action or the spring 14. The cover 22 is formed, at a specified position of the top plate thereof, with a slot 22′ having substantially the same length as the cavity 13 and a slightly larger width than the profile member 12. A cover plate 28 fitted around and movable with the profile member 12 is placed on the cover 22 and always covers the slot 22'.

Since the profile member 12 is always pressed by the spring 14 against the open end of the adjusting sheath 19 while being pushed upward away from the support rod 11 by the spring 17 when the threading apparatus is out of threading operation, the profile member 12 is readily shiftable by the handle 21.

Figure 6:
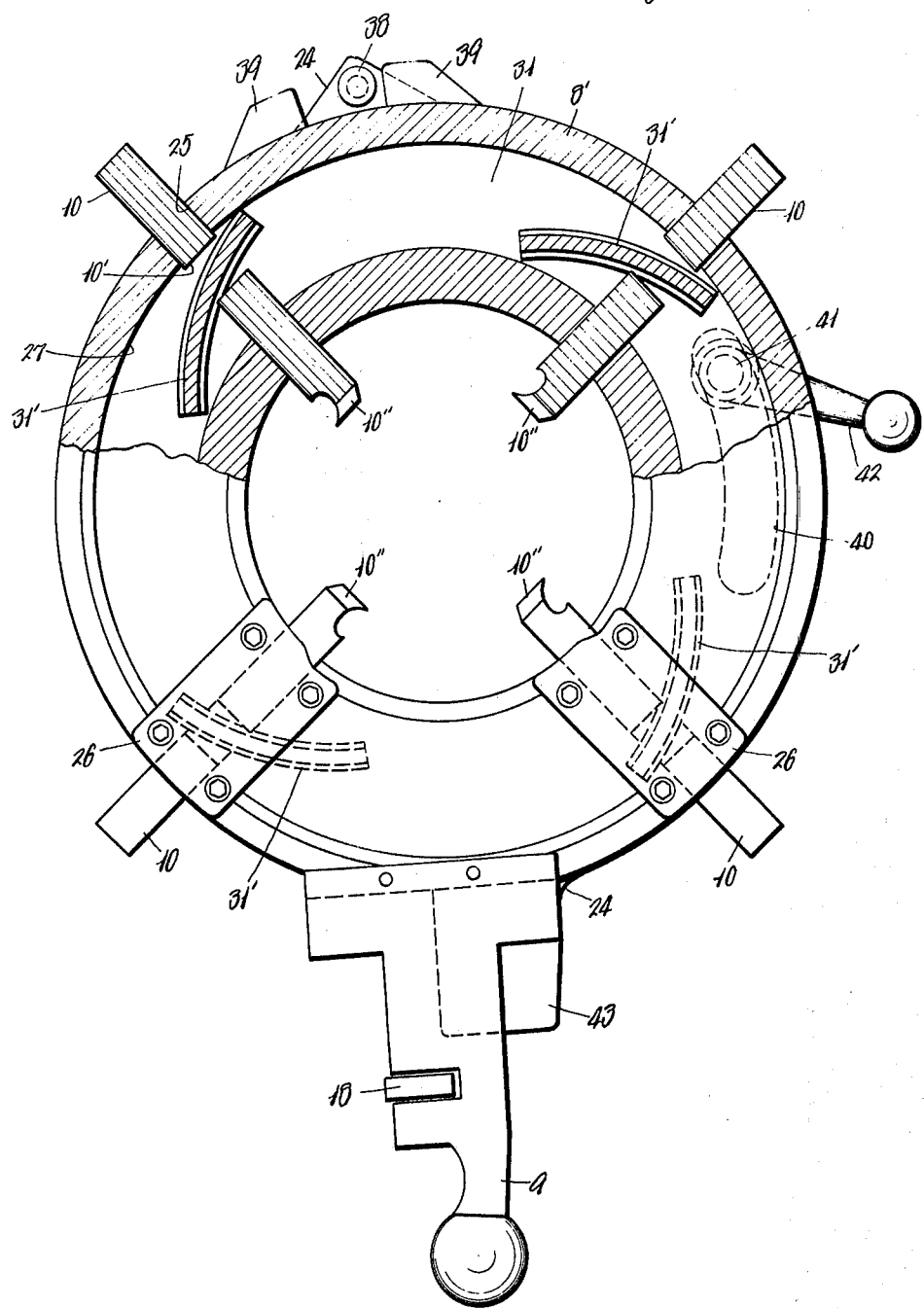
FIG. 6 is a front view partly broken away to show a die head.
Figure 7:
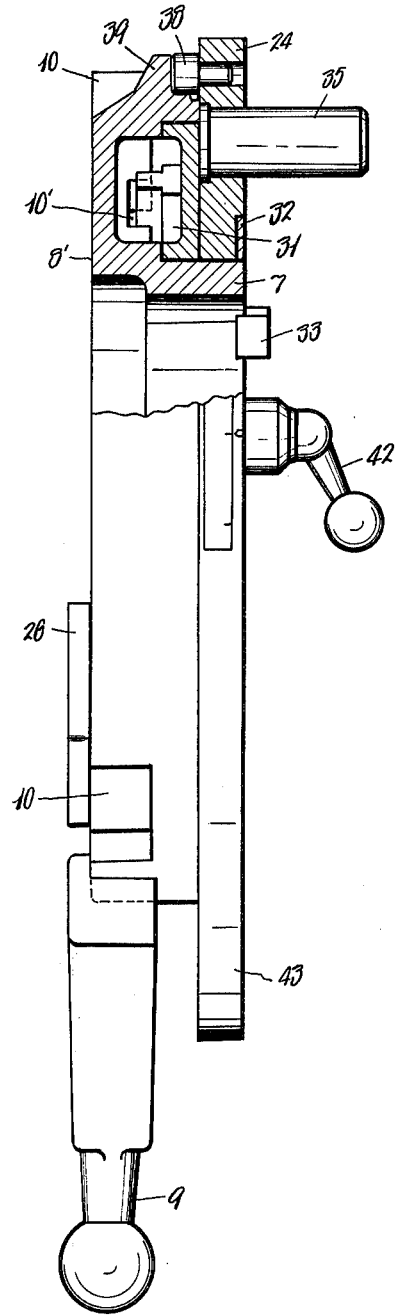
FIG. 7 is a side elevation partly broken away and showing the same.
Figure 8:
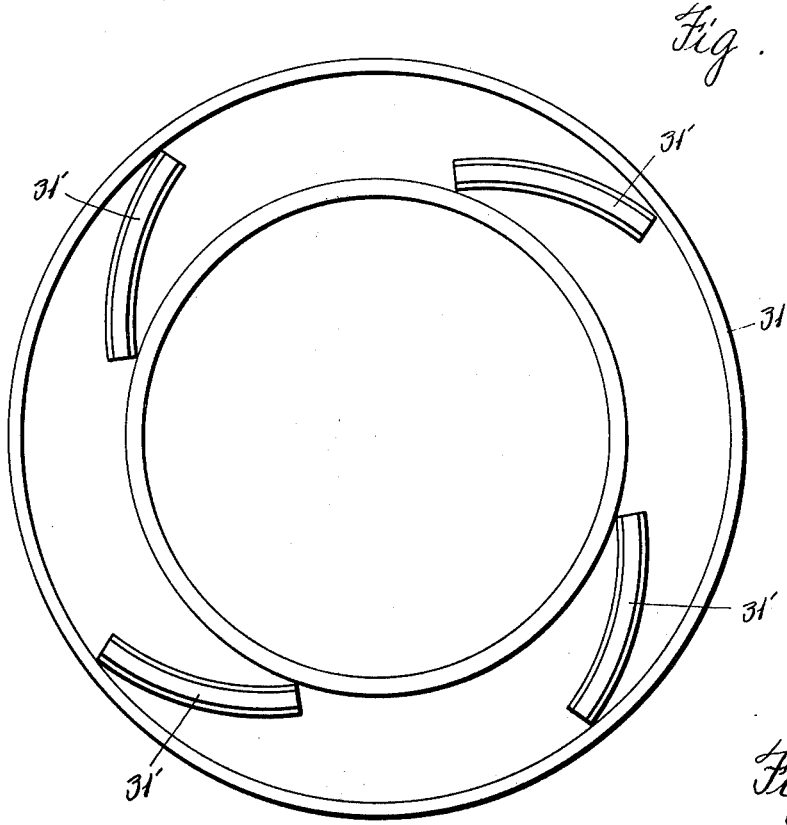
FIG. 8 is a front view of a chaser holding plate.
Figure 9:
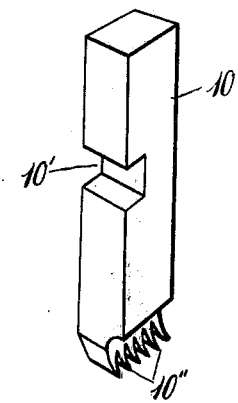
FIG. 9 is a perspective view showing a chaser.

As shown in FIGS. 6 to 8, the die head 8 comprises a die head main body 8', a chaser holding plate 31, a retaining ring 24 and chasers 10. As seen in FIG. 9 the chaser 10 has cutting blades 10" at its front end and a cutout portion 10' in its one side.

The die head main body 8' is in the form of a doughnut-like disk and has an annular groove 27 in its side surface facing the reamer 45, the annular groove 27 being adapted to rotatably receive the chaser holding plate 31 therein. Formed in the other side surface of the main body 8' are radial grooves 25 in which the chasers 10 are loosely fittable and which communicate each at its midportion with the groove 27. Projecting from the outer periphery of the doughnut-like disk is an arm 9 rotatably carrying a roller 18 on the under side of its front end.

The inner peripheral edge of the doughnut-like disk projects toward the reamer 45 in the form of a projection 7. The side surface of the doughnut-like disk facing the drive means 2 is fixedly provided with holders 26 for supporting the chasers 10 loosely fitted in the grooves 25.

The chaser holding plate 31 is provided, on one surface thereof fitted in the annular groove 27, with guide projections 31' extending partially along several spiral curves and each fittable in the cutout portion 10' in the chaser 10.

The retaining ring 24 is in the form of a doughnut-like disk having an inner diameter larger than the inner diameter of the die head main body 8' and an outer diameter substantially equal to the outer diameter of the die head main body 8'. The retaining ring 24 has an arcuate slot 40 at a specified position and a projection 43 extending from its outer periphery.

At a predetermined position on the side surface of the chaser holding plate 31 opposite to its other side surface having the guide projections 31', there is provided a rod 41 extending through the slot 40 and having a lever 42, so that the chaser holding plate 31 having the rod 41 thereon is turnable. The guide projections 31' on the chaser holding plate 31 and the cutout portions 10' in engagement with the projections 31' are therefore shiftable relative to each other to thereby inwardly or outwardly move the chasers 10 having the recessed portion 10'. Consequently, the cutting blades 10" of the chasers 10 can be brought to the position coinciding with the desired depth of their engagement in the wall surface of the pipe 20 to be rotated by the drive means 2 as fixed by the chucks 4 and 5.

The retaining ring 24 is held by the die head main body 8' and by a plurality of holding pawls 33 secured by bolts to the inner peripheral projecting edge of the die head main body 8', with a thrust ring 32 interposed between the ring 24 and the pawls 33. A bolt 38 fixed to the side surface of the retaining ring 24 is interposed between a pair of protrusions 39 and 39 radially extending from the outer periphery of the die head main body 8'.

The projection 43 of the retaining ring 24 is secured by a member 37 to a support 36 fixedly mounted on the carriage 3. At one end of the ring 24 opposite to the projection 43, a mounting rod 35 is provided on the side surface of the ring 24 which surface faces the reamer. The mounting rod 35 is inserted into a support portion on the carriage 3 to support the die head.

The apparatus of this invention operates in the following manner.

When the arm 9 of the die head main body 8' is placed on the profile surface 12', the roller 18 rotatably mounted on the front end under side of the arm 9 bears against the predetermined portion of the profile surface 12'. The lever 42 is then moved to set the cutting blades 10" of the chaser 10 to a predetermined depth of threading.

Subsequently, the feed handle 6 is turned to advance the die head 8 and carriage 3 toward the pipe 20 rotated by the drive means 2, whereby the cutting blades 10" of the chasers 10 on the die head 8 are engaged in the end of the pipe 20. Consequently, the torque of the pipe 20 is delivered through the chasers 10 to the die head main body 8', causing the arm 9 to depress the profile member 12 into contact with the support rod 11.

In this state, the die head 8 and carriage 3 advance toward the drive means 2 at a speed determined by the lead of the chasers 10 and by the number of revolutions of the pipe 20, while simultaneously permitting the roller 18 to roll down the profile surface 12' of the profile member 12 fixedly pressed against the support 11. As a result, the die head main body 8' slowly turns relative to the retaining ring 24, gradually changing the relative position between the guide projections 31' on the chaser holding plate 31 and the chasers 10 having the cutout portions 10' in engagement with the guide projections 31'. The chasers 10 are therefore gradually centrifugally retracted. The pipe 20 is automatically formed with a threaded portion having a taper proportional to the inclination of the profile surface and a length equal to the horizontal distance of rolling motion of the roller 18.

The moment when the roller 18 falls off the profile surface 12', the die head 8' turns a large amount, greatly retracting the chasers 10 in a centrifugal direction to thereby instantaneously move the chasers 10 away from the pipe 20, whereupon the threading operation is completed.

When the threading operation is completed, the carriage 3 comes to a halt, while the profile member 12 is freed from the pressure of the arm 9 and upwardly moved by the action of the spring 17 out of contact with the support rod 11. Since the chasers 10 are away from the pipe 20, the carriage 3 is movable by the freed handle 6.

When the threading operation is completed, the profile member 12 is pressed by the spring 14 against the arm 9, which, when lifted, permits the profile member 12 to come back into pressing contact with the open end of the adjusting sheath 9.

As already described, the apparatus of this invention includes the carriage 3 having the die head 8 and fitted with the profile member 12, the profile member 12 and the die head 8 being adapted to set the taper and the length of the tapered portion simply when the arm 9 of the die head 8 is placed on the profile surface 12'. Moreover, the profile member 12, which is merely fitted on the guide rod 15, is easy to mount on or remove from the carriage 3, so that if many profile members 12 having profile surfaces corresponding to the tapers of various threaded portions are prepared for replacement, the taper of the threaded portion can be readily changed, and the length of the threaded portion is easily variable by shifting the adjusting sheath 19 by the lever 21 to slidingly move the profile member 12. Because the threading torque transmitted through the roller 18 fixedly presses the profile member 12 against the support rod 11, and the carriage 3 advances at a speed determined by the number of revolutions of the pipe 20 and by the lead of the chasers 10, there is no necessity to provide special feed means and power source for advancing the carriage 3. Furthermore since the chasers 10 are instantaneously moved away from the pipe 20 with the carriage 3 automatically brought to a halt when the threading operation is completed it is not necessary to provide special stopping means. With these various advantages, the present apparatus is simple in construction and easy to operate.

What is claimed is:

1. An apparatus for automatically forming a threaded portion having a predetermined taper and length for use in an automatic threading machine having a frame, said apparatus comprising:
    a pair of longitudinal support rods mounted parallel to said frame of said threading machine;
    die head means for forming said threaded portion;
    carriage means movably mounted on said support rods for supporting said die head means thereon, said carriage means having a longitudinal cavity therethrough parallel to and surrounding one of said support rods; and
    profile means for controlling the length and taper of the threaded portion formed by said die head means, said profile means having a slanted profile surface and fitted in said longitudinal cavity of said carriage means and movably mounted on said support rod in said longitudinal cavity, said profile means further extending above the surface of said carriage means, and removably contacting said die head means at said slanted profile surface.

2. An apparatus as claimed in claim 1, wherein:
said profile means has a longitudinal groove therethrough above said support rod on which it is mounted; and
said carriage means includes:
    a guide rod positioned above said longitudinal cavity therein and extending through said longitudinal groove in said profile means,
    a spring surrounding said guide rod and biased against said profile member, and
    a longitudinally adjustable sheath surrounding said guide rod opposite the end surrounded by said spring, said adjustable sheath also abutting said profile member on the side opposite the side thereof contacted by said spring, whereby said profile member is continuously biased against said adjustable sheath by said spring and whereby adjusting said adjustable sheath longitudinally against said profile means forces the profile means against said spring and controls the length of the threaded portion formed by the die means contacting said profile means.

3. An apparatus as claimed in claim 2, wherein:
said profile means further has at the center thereof a vertical bore extending upward from said longitudinal groove therethrough; and
wherein said profile means further includes:
    a ball positioned in said vertical bore against said guide rod in said longitudinal groove, and
    a spring between said ball and the top of said vertical bore forcing said profile means upward,
whereby the threading torque passing from the die head means forming the threaded portion and contacting the slanted surface of said profile means causes said profile means to press downward against said support rod, thereby causing said die head means to move along the slanted surface of said profile means to form a threaded portion having a taper proportional to the inclination and length of said slanted surface.

* * * * *